United States Patent [19]

Naimpally et al.

[11] Patent Number: 5,650,825
[45] Date of Patent: Jul. 22, 1997

[54] METHOD AND APPARATUS FOR SENDING PRIVATE DATA INSTEAD OF STUFFING BITS IN AN MPEG BIT STREAM

[75] Inventors: Saiprasad V. Naimpally, Langhorne, Pa.; Ren Egawa, Princeton, N.J.

[73] Assignee: Matsushita Electric Corporation of America, Secaucus, N.J.

[21] Appl. No.: 414,526

[22] Filed: Mar. 31, 1995

[51] Int. Cl.⁶ .............................. H04N 7/00; H04N 11/00
[52] U.S. Cl. ........................ 348/465; 348/473; 370/505; 370/528
[58] Field of Search .................... 348/461, 463, 348/465, 467, 473; 370/111, 110.4, 102, 112, 91, 94.2, 99; 375/372; H04N 7/00, 11/00

[56] References Cited

U.S. PATENT DOCUMENTS

| | | | |
|---|---|---|---|
| 4,667,324 | 5/1987 | Graves | 370/102 |
| 4,667,334 | 5/1987 | Collec et al. | 375/116 |
| 5,168,356 | 12/1992 | Acampora et al. | |
| 5,416,772 | 5/1995 | Helton et al. | 370/112 |
| 5,544,172 | 8/1996 | Abbas | 370/102 |

FOREIGN PATENT DOCUMENTS

WO95/06391  3/1995  WIPO.

OTHER PUBLICATIONS

Video Section of Information Technology—Generic Coding of Moving Pictures and Associated Audio ISO/IEC 13818-1 (Nov. 1994).

Systems Section of Information Technology—Generic Coding of Moving Pictures and Associated Audio ISO/IEC 13818-1 (Nov. 1994).

Hopkins, "Digital Terrestrial HDTV For North America: The Grand Alliance HDTV System", *IEEE Transactions on Consumer Electronics*, vol. 40, No. 3, pp. 185–197 (Aug. 1994).

Primary Examiner—Michael H. Lee
Attorney, Agent, or Firm—Ratner & Prestia

[57] ABSTRACT

An apparatus and method, applicable to variable bit rate video and constant bit rate video, is disclosed for replacing "stuffing bytes" with private data. The invention takes advantage of the otherwise wasted resources dedicated to "stuffing" in a data stream in order to insert private data. This is accomplished by inserting useful private data in a Transport Stream instead of the stuffing bits. That is, effectively, a re-multiplexing operation occurs where, based on the existence of certain conditions in a Transport Packet (e.g., stuffing bytes exist), the information necessary to replace stuffing bytes with private data yet still comply with established standards is accomplished. This data generally is referred to as privatestuff data in order to distinguish it from typical private data which may otherwise be encoded into a Transport Stream. The stuffing bytes removed from the Transport Packet may come from an adaptation field in the Transport Header or directly from the Transport Payload or both.

18 Claims, 11 Drawing Sheets

Case A: MIN_V_SB=4 original | TP Header | TP Payload (including video stuffing bytes) | processed | TP Header | a.f.l. | a.f.h. | t.p.l. | P.D. | TP Payload (excluding video stuffing bytes) | a.f.l.[1 Byte]=adaptation_field_length=Cnt_V_SB-1
a.f.h.[1 Byte]=adaptation field header=0x02(to set only the transport_private_data_flag)
t.p.l.[1 Byte]=transport_private_data_length=Cnt_V_SB-3
P.D.[n Byte]=private data byte(s), where n=Cnt_V_SB-3

FIG. 8A

Case B: MIN_V_SB=3 original | TP Header | a.f.l. | TP Payload (including video stuffing bytes) | a.f.l.[1 Byte]=adaptation_field_length=0 processed | TP Header | a.f.l. | a.f.h. | t.p.l. | P.D. | TP Payload (excluding video stuffing bytes) | a.f.l.[1 Byte]=adaptation_field_length=Cnt_V_SB
a.f.h.[1 Byte]=adaptation field header=0x02(to set only the transport_private_data_flag)
t.p.l.[1 Byte]=transport_private_data_length=Cnt_V_SB-2
P.D.[n Byte]=private data byte(s), where n=Cnt_V_SB-2

FIG. 8B

Case C:MIN_V_SB=2 original

| TP Header | a.f.l. | a.f.h. | a.f.e. | TP Payload (including video stuffing bytes) | a.f.l.[1 Byte]=adaptation_field_length=u
a.f.h.[1 Byte]=adaptation field header=v
a.f.e.[(u−1) Byte]=adaptation field elements processed

| TP Header | a.f.l. | a.f.h. | a.f.e. | t.p.l. | P.D. | a.f.e. | TP Payload (excluding video stuffing bytes) | a.f.l.[1 Byte]=adaptation_field_length=u+Cnt_V_SB
a.f.h.[1 Byte]=adaptation field header=(0x02) OR (v),where OR represents an or operation
t.p.l.[1 Byte]=transport_private_data_length=Cnt_V_SB−1
P.D.[n Byte]=private data byte(s), where n=Cnt_V_SB−1
a.f.e.[(u−1) Byte]=original adaptation field elements which may appear before, after, or both before and after the P.D. depending on the elements.

METHOD AND APPARATUS FOR SENDING PRIVATE DATA INSTEAD OF STUFFING BITS IN AN MPEG BIT STREAM

FIELD OF THE INVENTION

The present invention relates generally to data storage and transmission using MPEG standards and, more particularly, the present invention relates to the established standards of transmitting "private data" and "stuffing bytes" in a Transport Data Stream complying with MPEG standards.

BACKGROUND OF THE INVENTION

High Definition Television (HDTV) continues to make progress in its attempts to replace conventional television. Paving the way for this progress are various companies and associations working on standards to provide for a global market for HDTV.

One such group of companies is known as the "Digital HDTV Grand Alliance" including members such as AT&T, David Sarnoff Research Center, Massachusetts Institute of Technology and others. A comprehensive overview of the strides made by this group are presented in an article by Robert Hopkins entitled "Digital Terrestrial HDTV for North America: The Grand Alliance HDTV System" published in the IEEE Transactions on Consumer Electronics (Summer 1994). This article is herein incorporated by reference for all of its teachings regarding the background and basics of HDTV systems including the use of Program and Transport Packet Streams.

In addition to the Grand Alliance, much effort has been expended by the Moving Pictures Expert Group (MPEG), a committee within the International Standards Organization (ISO), in attempts to establish various standards for the storage and transmission of HDTV data (e.g., MPEG-2 standards—formats for Transport Packet Streams). Accepted standards are periodically published such as the Video Section of Information Technology—Generic Coding of Moving Pictures and Associated Audio ISO/IEC 13818-2 (November 1994) (hereinafter "Video Section") and the Systems Section of Information Technology—Generic Coding of Moving Pictures and Associated Audio ISO/IEC 13818-1 (November 1994) (hereinafter "Systems Section") both of which are herein incorporated by reference for their teachings regarding established standards and formats including "stuffing" techniques.

The syntax for the MPEG-2 standard defines several layers of data records which are used to convey both audio and video data. For the sake of simplicity, the decoding of the audio data is not described herein. Encoded data which describes a particular video sequence is represented in several nested layers, the Sequence layer, the Group of Pictures layer, the Picture layer, the Slice layer and the Macroblock layer. To aid in transmitting this information, a digital data stream representing multiple video sequences is divided into several smaller units and each of these units is encapsulated into a respective packetized elementary stream (PES) packet. For transmission, each PES packet is divided, in turn, among a plurality of fixed-length Transport Packets. Each Transport Packet contains data relating to only one PES packet. The Transport Packet also includes a header which holds control information, sometimes including an adaptation field, to be used in decoding the transport packet.

When an MPEG-2 encoded image is received, a transport decoder decodes the Transport Packets to reassemble the PES packets. The PES packets, in turn, are decoded to reassemble the MPEG-2 bit-stream which represents the image in the layered records, as described above. A given transport data stream may simultaneously convey multiple image sequences, for example as interleaved transport packets. This flexibility also allows the transmitter to switch among formats providing material in 4 by 3 aspect ratio according to one standard and widescreen (16 by 9) material according to another standard.

Figure 1:
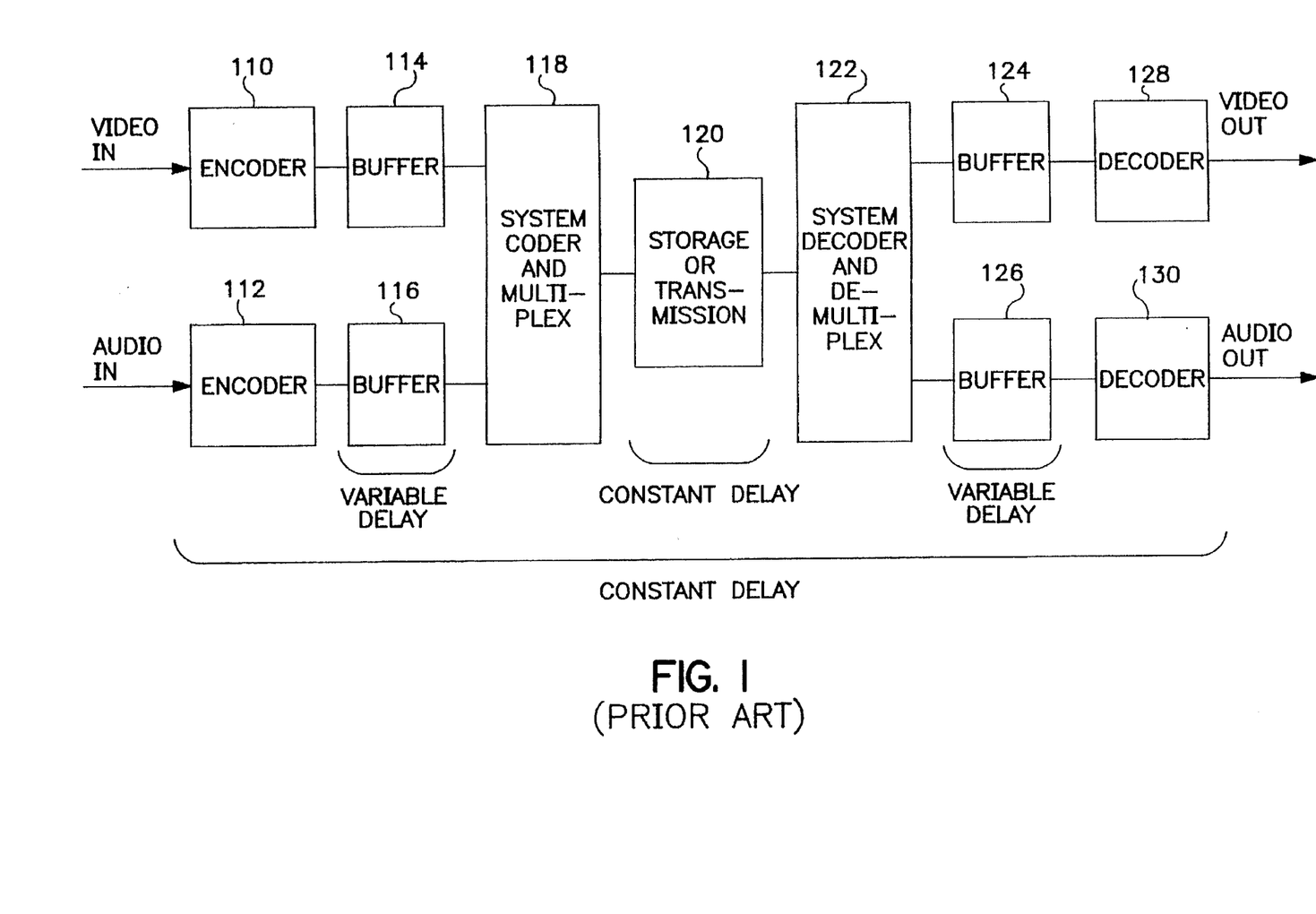
FIG. 1 (prior art) shows a high-level block diagram of an exemplary digital multi-program transmission and receiving system.

Turning to a system implementation for delivering HDTV using MPEG-2 standards to the consumer, in general, as illustrated in high-level block diagram of FIG. 1, on the transmission side, video and audio signals are input to respective encoders 110 and 112, buffered in buffers 114 and 116, delivered to the system coder/multiplexer 118, and stored in storage unit 120 or transmitted by transmitter unit 120. On the receiving side, the signals are received by a system decoder/demultiplexer 122, again buffered in buffers 124 and 126, then decoded by decoders 128 and 130 and output as the original video and audio signals.

An important aspect of the illustration of FIG. 1 is that, although the intermediate stage buffering of the signals includes a variable delay, the overall delay from input to output of the signals is required to be substantially constant. This is accomplished by monitored flow control and buffers.

As indicated in FIG. 1, the delay from the input to the encoder to the output or presentation from the decoder is constant in this model, while the delay through each of the encoder and decoder buffers is variable. Not only is the delay through each of these buffers variable within the path of one elementary stream, the individual buffer delays in the video and audio paths differ as well. Therefore, the relative location of coded bits representing audio or video in the combined stream does not indicate synchronization information. The relative location of coded audio and video is constrained only by a System Target Decoder (STD) model such that the decoder buffers must behave properly; therefore, coded audio and video that represent sound and pictures that are to be presented simultaneously may be separated in time within the coded bit system by as much as one second, which is the maximum decoder buffer delay that is allowed in the STD model. Similar to the STD model is a Video Buffering Verifier (VBV) which, as stated in the Video Section:

> Constant rate coded video bitstreams shall meet constraints imposed through a Video Buffering Verifier (VBV) defined in this clause . . .
>
> The VBV is a hypothetical decoder, which is conceptually connected to the output of an encoder . . . Coded data is removed from the buffer as defined below. It is required that a bitstream that conforms to this specification shall not cause the VBV to overflow. When low_delay equals 0, the bitstream shall not cause the VBV buffer to underflow . . .

Figure 2:
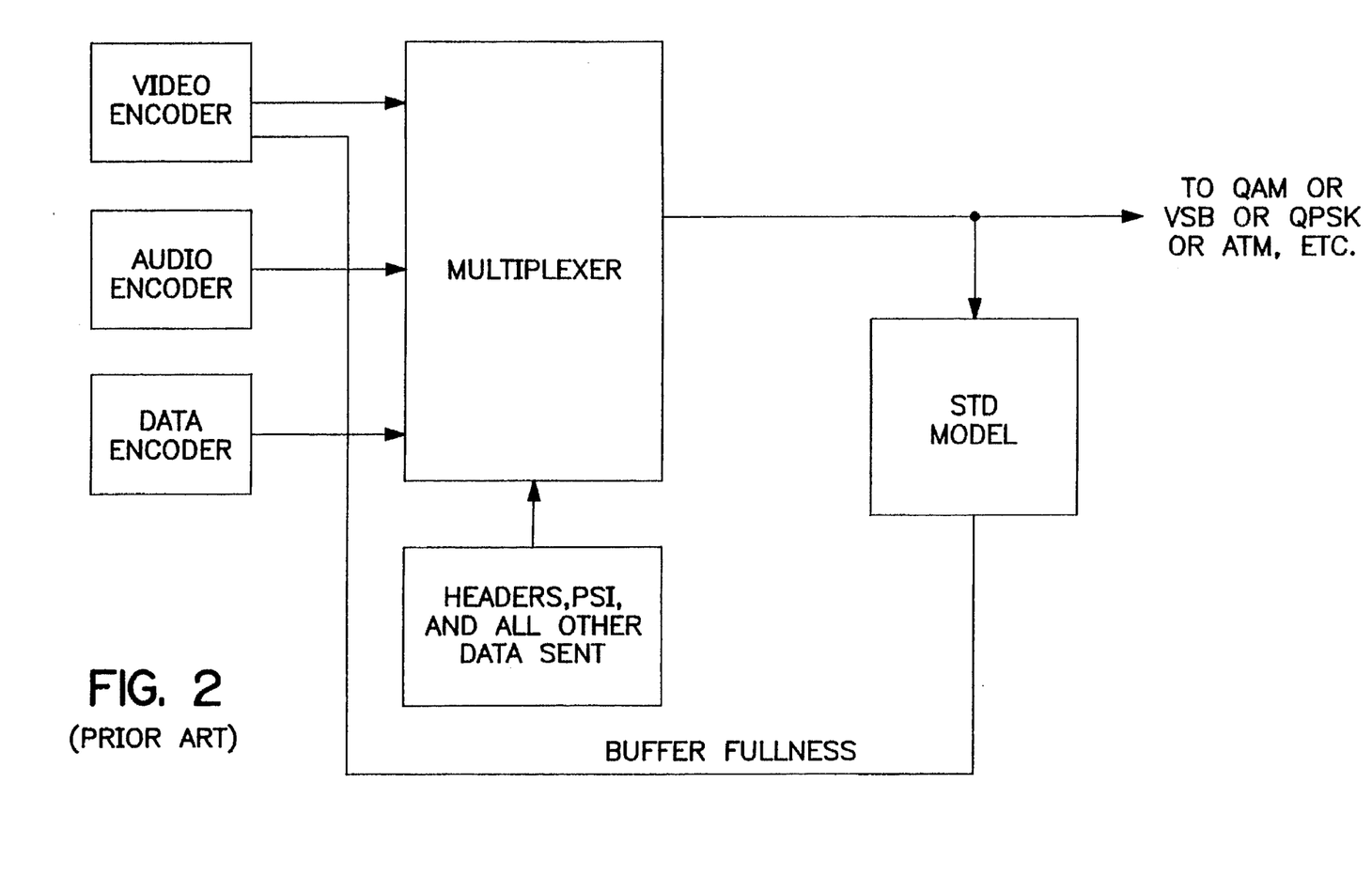
FIG. 2 (prior art) shows a high-level block diagram of an exemplary implementation of a STD model with portions of the system shown in FIG. 1.

A high-level illustration of an exemplary STD model operating in conjuntion with an encoder is shown in FIG. 2.

The requirement that the VBV buffer or STD model decoders not underflow is very important as product quality is at stake. In order to maintain constant bitrate video, "stuffing" is implemented within various aspects of the system. "Stuffing" is the act of filling the data stream with "don't care" information simply to maintain the required bit-rate.

For Transport Stream packets carrying PES packets, stuffing is used when there is insufficient PES packet data to fill the Transport Stream packet payload bytes to a level that would support the transmitted data rate.

Stuffing, for example, can be accomplished by defining an adaptation field longer than the sum of the lengths of the data elements in it, so that the payload bytes remaining after the adaptation field exactly accommodates the available PES packet data. The extra space in the adaptation field and/or payload can be filled with stuffing bytes.

Figure 3:
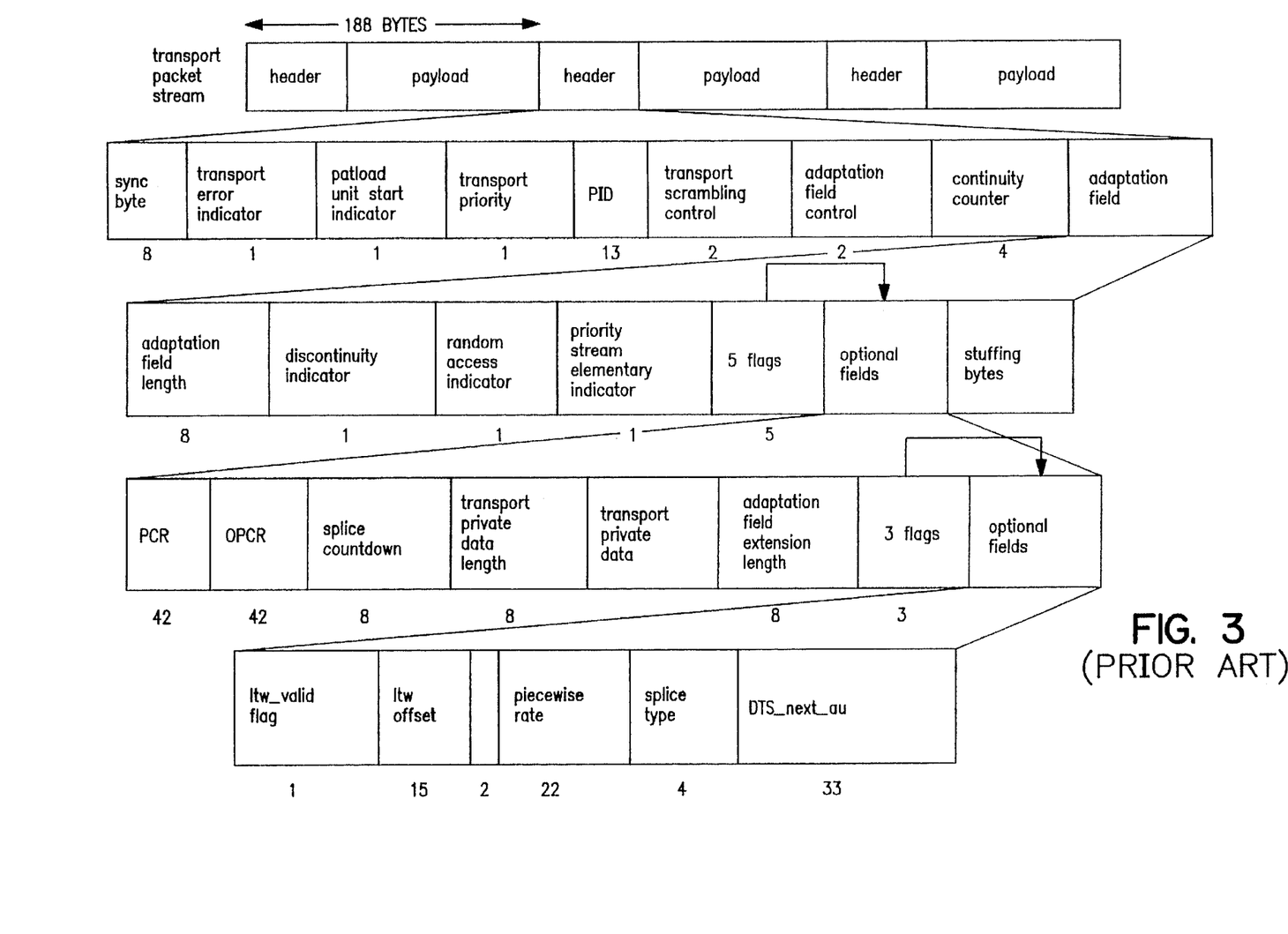
FIG. 3 (prior art) shows an exemplary format, including field designations, for a Transport Packet Stream used in conjunction with the system shown in FIGS. 1 and 2.

FIG. 3 shows the format and field locations for a Transport Packet Stream where each Transport Packet includes a Header and a Payload. The header of a Transport Packet includes fields for indicating the existence and controlling the length and content of an adaptation field. Within that adaptation field, another field is designated as "stuffing bytes". Stuffing bytes are similarly used in the payload of the Transport Packets.

As mentioned, however, using stuffing bytes, which typically comprise all logical one values (i.e., "11111111") in the Transport Header and all logical zero values (i.e., "00000000") in the Transport Payload, is a waste of system resources (e.g., transmission bandwidth). Accordingly, it would be desirable to make more efficient use of the system resources which, to date, have been limited to "stuffing".

SUMMARY OF THE INVENTION

The present invention, in a system including variable bit-rate video data in the form of data packets which uses stuffing bytes to fill a data stream, is directed to a method and system for removing the stuffing bytes and using the additional bandwidth to transmit private data (hereinafter "privatestuff data"). The invention includes examining means for examining a data packet which includes an indication of whether stuffing bytes are being used in the data packet and determining if the data packet is eligible, according to predetermined criteria, to have the stuffing bytes removed; and re-multiplexing means, responsive to the examining means, for removing the stuffing bytes from the data packet and adding predetermined privatestuff data to the data packet.

In one aspect of the invention, the stuffing bytes are removed from a header portion of the data packet in order to gain additional transmission bandwidth.

In another aspect of the present invention, the stuffing bytes are removed from a payload portion of the data packet in order to gain additional transmission bandwidth. In both aspects, however, the privatestuff data is inserted into the header portion of the data packet.

BRIEF DESCRIPTION OF THE DRAWINGS

The invention is best understood from the following detailed description when read in connection with the accompanying drawing, in which.

DETAILED DESCRIPTION

As mentioned in the BACKGROUND section, for Transport Stream packets carrying PES packets, stuffing is used when there is insufficient PES packet data to fill the Transport Stream packet payload bytes to support the established data rate. One way stuffing can be accomplished is by defining an adaptation field that is longer than the sum of the lengths of the data elements in it, so that the payload bytes remaining after the adaptation field exactly accommodates the available PES packet data. The extra space in the adaptation field is filled with stuffing bytes. Another way stuffing can be accomplished is by filling unused portions of the Transport Payload with zeros.

The present invention, generally applicable to variable bit-rate video, takes advantage of the otherwise wasted resources dedicated to "stuffing" in order to insert private data. In the exemplary embodiment of the present invention, to take advantage of these otherwise wasted resources, useful private data is inserted in the Transport Stream instead of the stuffing bits. That is to say, effectively, a re-multiplexing operation occurs where, based on the existence of certain predetermined conditions in the fields of the Transport Stream (e.g., stuffing bytes exist), the information necessary to replace stuffing bytes with private data yet still comply with the standard is generated and appropriately inserted.

It should be noted that, although the present invention is described as being generally applicable to variable bit rate video, it essentially is also applicable to constant bit rate video. That is to say, that, although, in the present invention, the modified video will always be variable bit rate video, the original video to be processed and transmitted may be either constant or variable bit rate video.

The data that is used to replace the stuffing bytes generally will be referred to as "privatestuff" data in order to distinguish it from typical private data which may otherwise be encoded into a Transport Stream.

When privatestuff data is inserted in the Transport Stream, if necessary, it can be sent with an individual program identification (PID) code indicating that the present Transport Packet includes privatestuff data. As described in the Systems Section, a PID is a 13-bit field in a Transport Stream Header, indicating the type of data stored in the packet payload. Some PID values are assigned and some are reserved. In the exemplary embodiment of the present invention, newly assigned PID values can be designated to indicate that the private data included in the particular Transport Packet is actually privatestuff data rather than normal private data. If a newly assigned PID is used, decoding of privatestuff data may be easier on the receiving end.

It should also be noted that, in addition to stuffing bytes, some Transport Packets are designated NULL packets using a special NULL PID. Using the techniques described herein, the present invention could also take advantage of the wasted resources of a NULL packet by remultiplexing the packet to include privatestuff data and all other appropriate fields (e.g., adaptation and private data fields).

Additionally, as the stuffing bytes are only used on an "as needed" basis, the privatestuff data is sent on a "bursty" basis, i.e., only when the video channel "wants" to send stuffing bytes. Examples of information which can be sent as privatestuff data include program reviews, program synopsis, etc for programs to be transmitted at a later time.

As additional background, in the Systems Section, a syntax representation is provided for encoding/decoding the adaptation field of a Transport Header. This syntax is re-presented below in Table I.

TABLE I

Transport Stream adaptation field

| Syntax | No. of Bits | Mnemonic |
|---|---|---|
| adaptation_field() { | | |
|   adaptation_field_length | 8 | imsbf |
|   if(adaptation_field_length>0) { | | |
|     discontinuity_indicator | 1 | bslbf |
|     random_access_indicator | 1 | bslbf |
|     elementary_stream_priority_indicator | 1 | bslbf |
|     PCR_flag | 1 | bslbf |
|     OPCR_flag | 1 | bslbf |
|     splicing_point_flag | 1 | bslbf |
|     transport_private_data_flag | 1 | bslbf |
|     adaptation_field_extension_flag | 1 | bslbf |
|     if(PCR_flag == '1') { | | |
|       program_clock_reference_base | 33 | uimsbf |
|       reserved | 6 | bslbf |
|       program_clock_reference_extension | 9 | uimsbf |
|     } | | |
|     if(OPCR_flag == '1') { | | |
|       original_program_clock_reference_base | 33 | uimsbf |
|       reserved | 6 | bslbf |
|       original_program_clock_reference_extension | 9 | uimsbf |
|     } | | |
|     if (splicing_point_flag == '1') { | | |
|       splice_countdown | 8 | tcimsbf |
|     } | | |
|     if (transport_private_data_flag == '1') { | | |
|       transport_private_data_length | 8 | uimsbf |
|       for (i=0; i<transport_private_data_length;i++) { | | |
|         private_data_byte | 8 | bslbf |
|       } | | |
|     } | | |
|     if(adaptation_field_extension_flag == '1') { | | |
|       adaptation_field_extension_length | 8 | uimsbf |
|       ltw_flag | 1 | bslbf |
|       piecewise_rate_flag | 1 | bslbf |
|       seamless_splice_flag | 1 | bslbf |
|       reserved | 5 | bslbf |
|       if(ltw_flag == '1') { | | |
|         ltw_valid_flag | 1 | bslbf |
|         ltw_offset | 15 | uimsbf |
|       } | | |
|       if(piecewise_rate_flag == '1') { | | |
|         reserved | 2 | bslbf |
|         piecewise_rate | 22 | uimsbf |
|       } | | |
|       if(seamless_splice_flag == '1') { | | |
|         splice_type | 4 | bslbf |
|         DTS_next_au[32 ... 30] | 3 | bslbf |
|         marker_bit | 1 | bslbf |
|         DTS_next_au[29 ... 15] | 15 | bslbf |
|         marker_bit | 1 | bslbf |
|         DTS_next_au[14 ... 0] | 15 | bslbf |
|         marker_bit | 1 | bslbf |
|       } | | |
|       for (i=0;i<N;i++) { | | |
|         reserved | 8 | bslbf |
|       } | | |
|     } | | |
|     for (i=0) ;i<N;i++) { | | |
|       stuffing_byte | 8 | bslbf |
|     } | | |
|   } | | |
| } | | |

As shown in Table I, stuffing bytes are placed into the Transport Header in the adaptation field as needed.

Referring to the syntax, the adaptation_field_length, listed in Table I and illustrated in FIG. 3, is an 8 bit field specifying the number of bytes in the adaptation_field immediately following the adaptation_field_length. For example, in the exemplary embodiment, the value 0 is used for inserting a single stuffing byte in a Transport Stream packet.

Moreover, when the adaptation_field_control value is '11', the value of the adaptation_field_length shall be in the range of 0 to 182. When the adaptation_field_control value is '10', the value of the adaptation_field_length shall be 183.

A stuffing_byte, for the adaptation field, is a fixed 8-bit value usually equal to '1111 1111' that can be inserted by the encoder. Once identified as stuffing bits, this "don't care" information is discarded on the reception end by the decoder.

Continuing with Table I, in addition to the stuffing bytes, the syntax of the standard for the adaptation field provides for private data. For example, as shown in FIG. 3, the two fields immediately before the stuffing bytes field are designated "5 flags" and "optional fields". The "5 flags" field indicates if the optional fields exist and, if so, the optional fields indicate the existence and length of "transport private data". This same interrelationship of the fields is also presented in syntactical format of Table I.

In addition to the stuffing bytes used in the adaptation field of the Transport Header, as mentioned, stuffing bytes may also be used in the Transport Payload. In the present invention, stuffing bytes from either the adaptation field or the Transport Payload can be removed to provide additional bandwidth for privatestuff data. It should be noted, however, whether stuffing bytes are removed from either the adaptation field or the Transport Payload or both, the privatestuff data added to the packet, in the exemplary embodiment of the present invention, is only added to an adaptation field in the Transport Header.

Figure 4A:
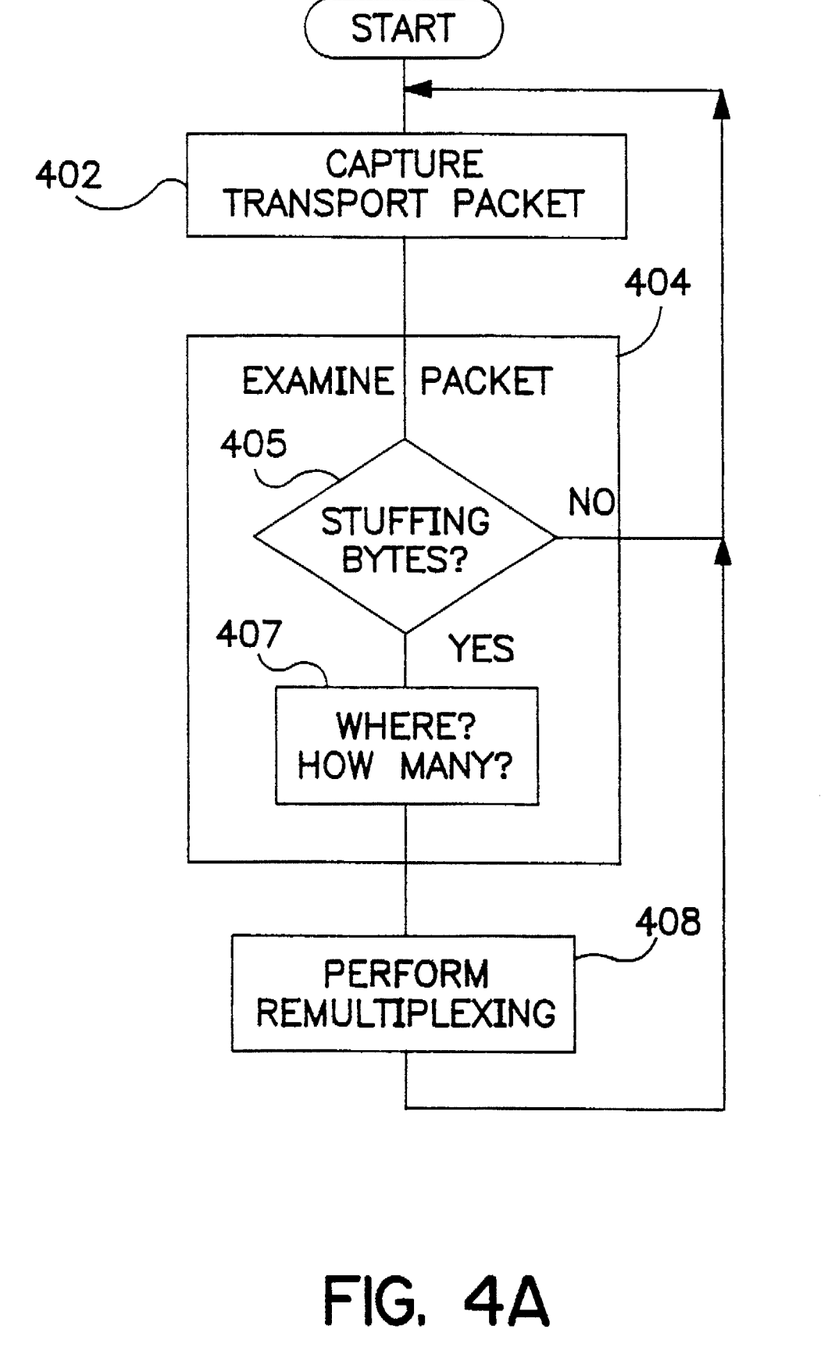
FIG. 4A shows a high-level flowchart diagram illustrating the exemplary steps executed by the present invention to generally replace stuffing bytes with privatestuff data.

FIG. 4A shows a high-level flowchart illustrating exemplary steps executed for generally completing a stuffing byte removal and replacement operation, also known as a remultiplexing operation. This flowchart is intended to generally illustrate stuffing byte replacement in either the adaptation field or Transport Payload.

As shown in FIG. 4A, first, at step 402, a Transport Packet is captured from the Transport Stream and, then, at step 404, the Packet is examined. The examination includes determining if stuffing bytes exist, step 405, and, if so, where and how many, step 407. Then, using information obtained during the examination, at step 408, a remultiplexing operation occurs. That is, the stuffing bytes are replaced with privatestuff data. Additional details for the above steps are provided below with reference to FIGS. 4B, 5-7 and 8A-8C.

Figure 4B:
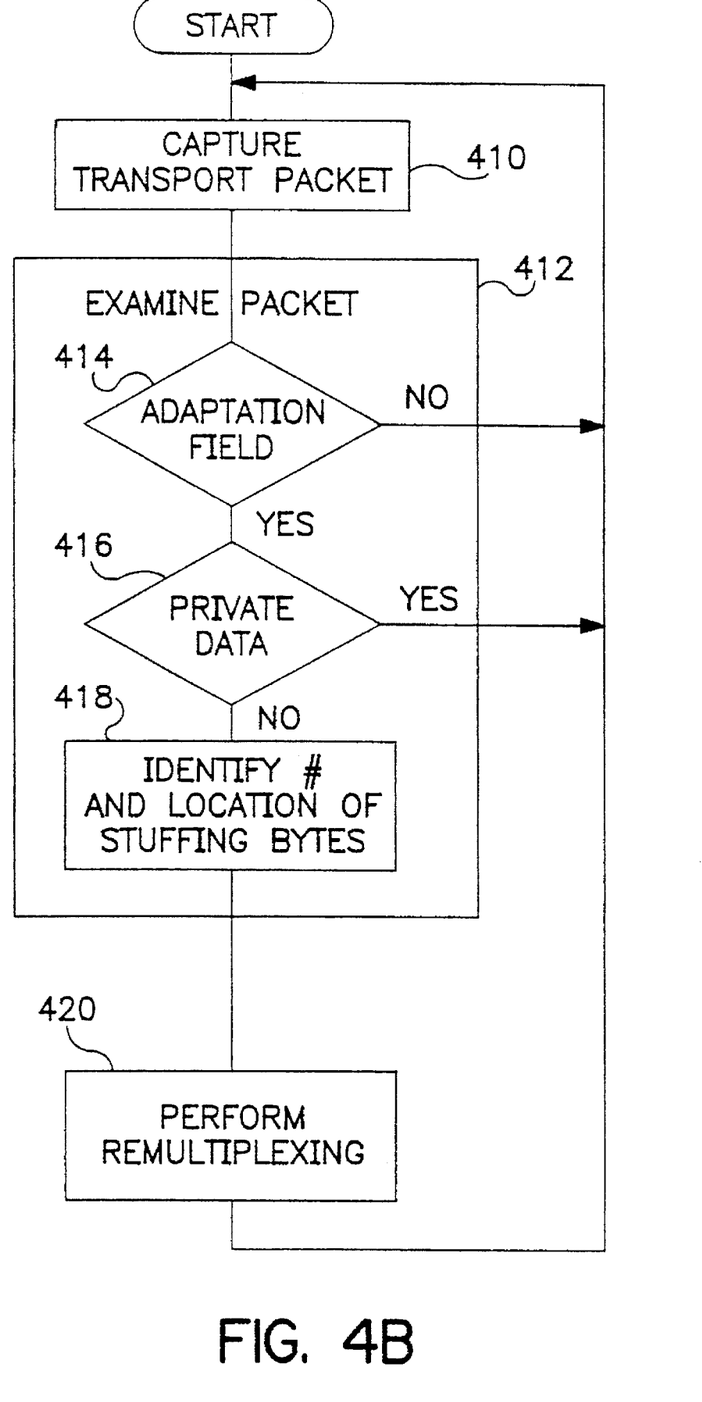
FIG. 4B shows a high-level flowchart diagram illustrating the exemplary steps executed by the present invention to replace stuffing bytes in the adaptation field with privatestuff data.

FIG. 4B shows a high-level flowchart diagram illustrating the exemplary steps executed by the present invention to replace stuffing bytes in the adaptation field with privatestuff data. As shown in FIG. 4B first, at step 410, a Transport Packet is captured from the Transport Stream and, then, at step 412, the Packet is examined. The examination includes, initially, determining if an adaptation field exists, step 414. This can be accomplished by examining various fields. Next, if there is an adaptation field, then it is determined if private data exists in the adaptation field, step 416. In the exemplary embodiment, this can be accomplished by examining the "5 flags" field and "transport private data length" field. If private data exists, the process ends because this adaptation field, in the exemplary embodiment of the present invention, will not be used for privatestuff data. It should be noted, however, that although it is possible to insert privatestuff data when private data already exists, the present invention intentionally elects to not disturb an adaptation field which already contains private data.

Continuing with the flowchart of FIG. 4B, if private data does not exist, the location and number of stuffing bytes is determined, at step 418, using the information from the various fields and, at step 420, a remultiplexing operation occurs.

Now, proceeding to the remultiplexing operation, it is important to remember that any modification of the adaptation field should adhere to established standards (i.e., the formats shown in FIG. 3 and the syntax listed in Table I). Therefore, if stuffing bytes in an adaptation field are to be replaced with privatestuff data, not only is the privatestuff data multiplexed into the data stream but all of the appropriate bits in the appropriate fields are set accordingly. For example if, in a particular adaptation field, no optional fields had existed in the initial examination, the "5 flags" field is modified to reflect that after the re-multiplex operation, the optional fields do exist. Furthermore, the number of privatestuff bytes is added to the "transport private data length" field in order to properly indicate the modification of the adaptation field.

Being aware of the established standards such as those herein incorporated by reference, one of ordinary skill in the art would appreciate the various combinations of fields which may exist when attempting to replace stuffing bytes with privatestuff data, thereby, understanding that all necessary fields would have to be modified during the re-multiplexing operation to reflect the updated content of the adaptation field.

Notwithstanding the abilities of one of ordinary skill in the art, by way of example, FIGS. 5-7 and 8A-8C show flowcharts and field replacement diagrams detailing the steps necessary to detect and remove stuffing bytes from a single Transport Payload and utilize the consequent extra bandwidth to transmit privatestuff data in an adaption field at the transport layer.

It should be noted that the method, illustrated in FIGS. 5-7 and 8A-8C, 1) finds the minimum required number of video stuffing bytes within a transport packet based on the structure of its adaptation field (described above), 2) locates the positions of video stuffing bytes within a transport payload and removes these bytes from the payload, 3) inserts private data at the adaptation field, and 4) locates a picture header structure and replaces its VBV_DELAY value with 0xFFFF.

It should be further noted that the method illustrated in FIGS. 5-7 and 8A-8C assumes that 1) the program association table (PAT) and program map table (PMT) have been processed and the PID for the targeted video elementary stream has been recognized and 2) the parsing of the payload of the Transport Payload containing the video elementary stream starts at or before the very first video sequence header and ends at the sequence end code.

Figure 5:
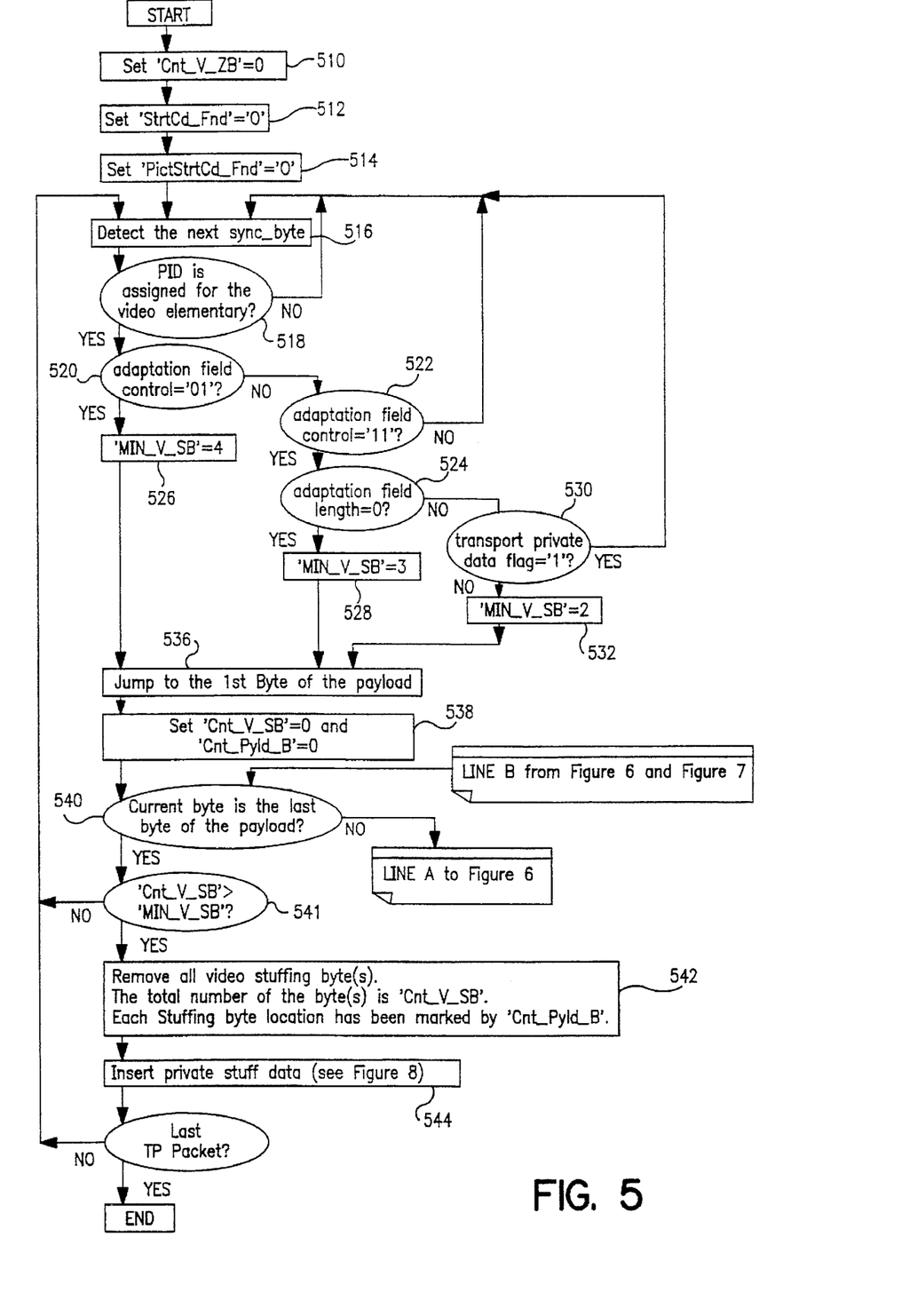
FIG. 5 shows a flowchart diagram illustrating the exemplary steps executed by the present invention to replace stuffing bytes in the packet payload with privatestuff data.
Figure 6:
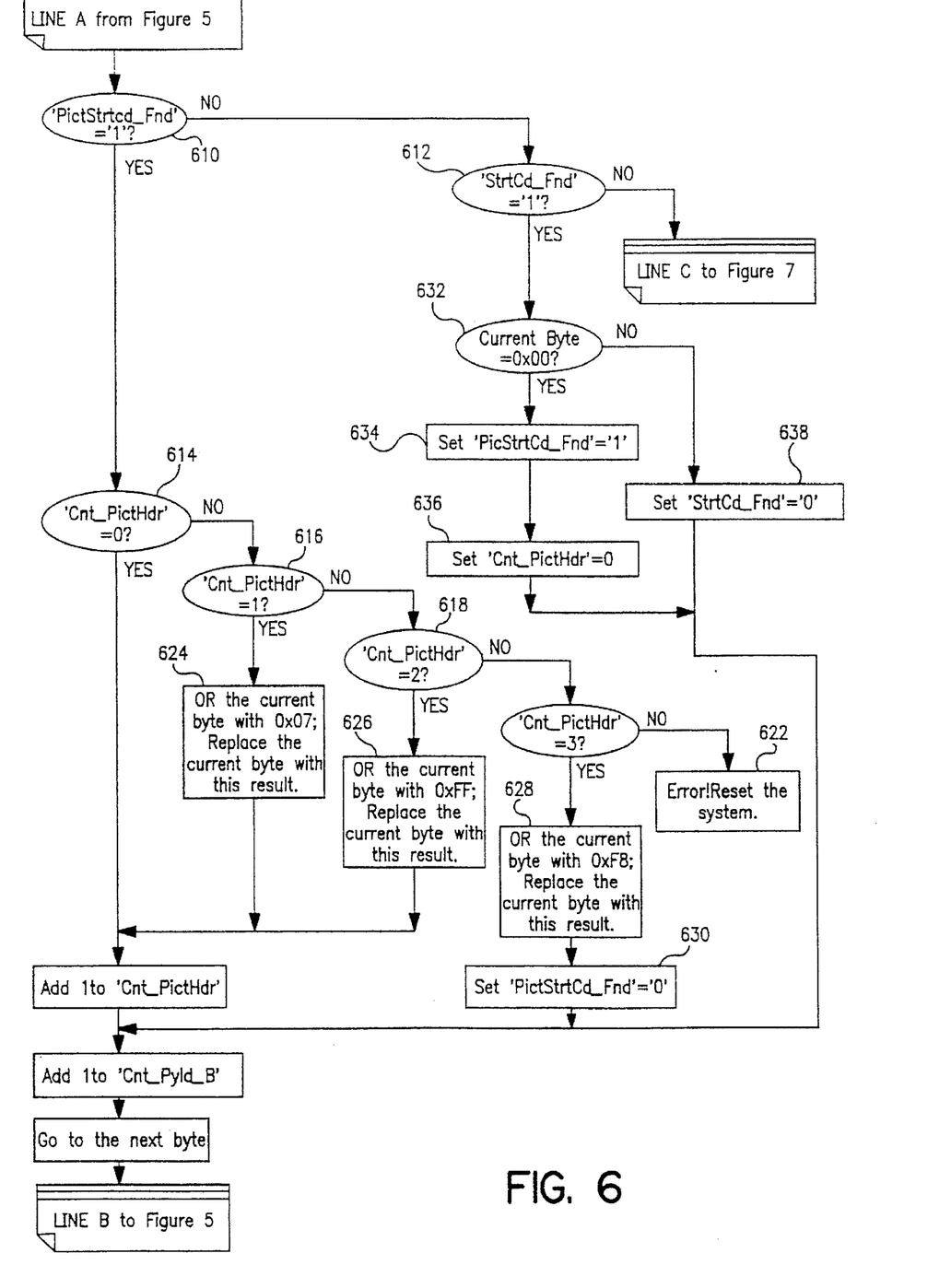
FIG. 6 shows a flowchart diagram illustrating an exemplary start code processing technique suitable for use with the embodiment shown in FIG. 5.
Figure 7:
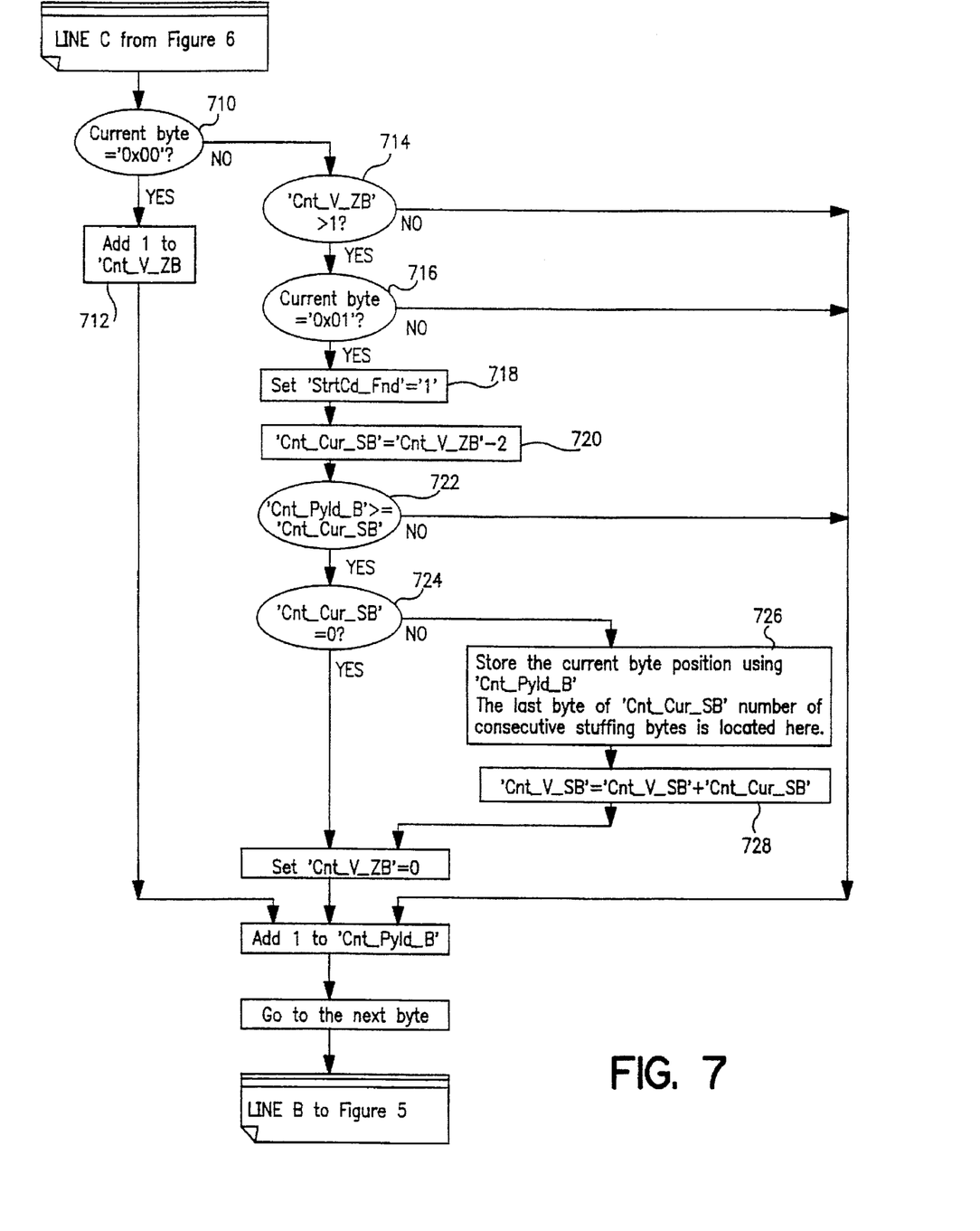
FIG. 7 shows a flowchart diagram illustrating an exemplary stuffing bytes searching technique suitable for use with the embodiment shown in FIG. 5.

Turning to FIG. 5-7, the illustrated processes examines many fields within the Transport Header and Payload as well as the tracking of some field sizes. For that purpose, variables are used throughout the process. In particular, the variable legends provided below for each of FIGS. 5, 6 and 7, show the particular variables used for that flowchart and their corresponding definitions:

Variables Used in FIG. 5

Cnt_V_ZB=Counter of video zero bytes
StrtCd_Fnd=Flag to indicate a finding of a start code
PictStrtCd_Fnd=Flag to indicate a finding of a picture start code
MIN_V_SB=Minimum number of video stuffing bytes that need to exist in the TP packet
Cnt_V_SB=Counter of video stuffing bytes
Cnt_Pyld_B=Counter of the TP payload bytes Variables Used in FIG. 6

PictStrtCd_Fnd=Flag to indicate a finding of a picture start code
StrtCd_Fnd=Flag to indicate a finding of a start code
Cnt_Pict_Hdr=Counter of bytes in a picture header structure Variables Used in FIG. 7

Cnt_Pyld_B=Counter of the TP payload bytes
Cnt_V_SB=Counter of video stuffing bytes
Cnt_V_ZB=Counter of video zero bytes
Cnt_Cur_SB=Counter of current video stuffing bytes
StrtCd_Fnd=Flag to indicate a finding of a start code Referring to FIG. 5, at steps 510–514, the variables "Cnt_V_ZB", "StrtCd_Fnd" and "PctStrtCd_Fnd", which are used during processing, are initialized. At steps 516 and 518, preprocessing is performed to detect the next sync byte and verify that the PID is for an elementary video program.

At steps 520, 522 and 524, the process examines the adaptation field control and length fields and, depending on the results of the examination, sets a variable indicative of the minimum number of stuffing bytes which need to exist in the Transport Packet, steps 526 and 528.

Next, at step 530, it is determined whether there is any private data in this adaptation field. And, again, based on this determination, the process sets a variable indicative of the minimum number of stuffing bytes which need to exist in the TP packet, step 532. Here, as mentioned, if it is determined that private data already exists in the adaptation field, then the process terminates and starts anew.

The process of FIG. 5, at step 536, then jumps to the first byte of the payload while, at step 538, initializing the variables "Cnt_V_SB" and "Cnt_Pyld_B".

Now, step 540 including its links to the flowcharts of FIGS. 6 and 7, essentially corresponds to step 404 in FIG. 4A. It is here that the number and location of stuffing bytes is determined. The flowchart of FIG. 6 detects and tracks start codes in the payload while the flowchart of FIG. 7 detects and counts stuffing bytes. Tracking where and how many bytes of each exist, allows the process to remove the stuffing bytes (thereby providing additional bandwidth for privatestuff data) and preserve the picture data. At step 541, Cnt_V_SB is checked to ensure that it is greater than MIN_V_SB. The purpose of step 541 is to ensure that the number of found stuffing bytes in this Transport Packet is larger than the minimum number of stuffing bytes that are required to exist in order to follow through with the remultiplexing.

Finally, at steps 542 and 544 (which generally correspond to step 408 of FIG. 4A), the stuffing bytes are removed and the re-multiplexing of privatestuff data, along with appropriate control field modifications, occurs, respectively. This re-multiplexing operation is further illustrated, as indicated at step 544) by way of example in FIGS. 8A, 8B and 8C.

Referring to FIG. 6, the process, knowing the format of start codes used by meaningful data (e.g., picture data) in the payload of a Transport Packet, counts the stuffing bits in the packet payload until a start code is encountered. A syntax for the various start codes is presented in the Video Section. This processing ensures that no meaningful picture data being carried by the Transport Packet Payload is disturbed.

As seen in steps 610 and 612, the process in FIG. 6, as long as either the PictStrtCd_Fnd or the StrtCd_Fnd is equal to '1', continues to recognize and process the Transport Payload one byte at a time until the condition exist where both the PictStrtCd_Fnd and the StrtCd_Fnd are equal to '0'. When this condition is detected, the process shifts to the steps illustrated in FIG. 7 which attempts to track and identify the stuffing bytes.

Until then, if PictStrtCd_Fnd is equal to '1' then the subsequent picture header bytes are tracked and processed, steps 614, 616, 618, 620, 622, 624, 626, and 628, until PictStrtCd_Fnd is finally reset at step 630. And, if PictStrtCd_Fnd is equal to '0' but StrtCd_Fnd is equal to '1' then, the current byte of data is processed, steps 632, 634, 636 and 638, such that either the PictStrtCd_Fnd is set, step 634, or the StrtCd_Fnd is reset, step 638.

It should be noted that the states of the variables PictStrtCd_Fnd and StrtCd_Fnd can reflect a condition that was processed and determined in a previous Transport Payload. That is to say, that picture data or stuffing bytes can overlap more than one Transport Payload, therefore, if the previous Transport Payload ended with a start code, the processing for the present Transport Payload should take that into consideration as Transport Packets are simply portions of a larger PES packet. For example, considering three consecutive Transport Packets, stuffing may begin midway through the Payload of the first packet, continue for the entire Payload of the second packet and end midway through the third packet. This type of condition should be considered during stuffing byte detection and removal.

Referring to FIG. 7, the process searches for stuffing bytes, carefully checking the value of all bytes and tracking the location of various points used to identify and, subsequently, remove the stuffing bytes. Briefly, steps 710 and 712 process and count the zero bytes that are encountered. Eventually the byte to be processed will not be '0x00', corresonding to the NO exit path from step 710, and likely be '0x01' indicating a start code has been found, corresponding to the YES exit path of step 716. At this point, the StrtCd_Fnd variable, which is used in FIG. 6, is set, step 718, and the stuffing byte counting stops. The actual number of stuffing bytes is determined by subtracting 2 from the Cnt_V_ZB, step 720, because a start code includes twenty three logical zeros and a logical one. However, step 716 only checks for seven logical zeros and a logical one, therefore, sixteen more logical zeros (or two bytes of '0x0000') are not considered stuffing bytes.

Consequently, if the number of stuffing bytes, Cnt_Cur_SB is less than the payload byte count, step 722, and not equal to zero, step 724, the location and amount of stuffing bytes is calculated and recorded using the variables such as Cnt_Pyld_B and Cnt_V_ZB which had been used to count and mark important points in the payload processing. It should also be noted that the number of stuffing bytes calculated during this processing is then added, at step 728, to the number of stuffing bytes previously recorded.

Additional discussion of FIGS. 6 and 7 is not warranted as one of ordinary skill in the art, having the description herein including FIGS. 5–7 and 8A–8C as well as the knowledge of established standards before him including those incorporated herein, can understand processes illustrated in FIGS. 6–7.

Figure 8A:
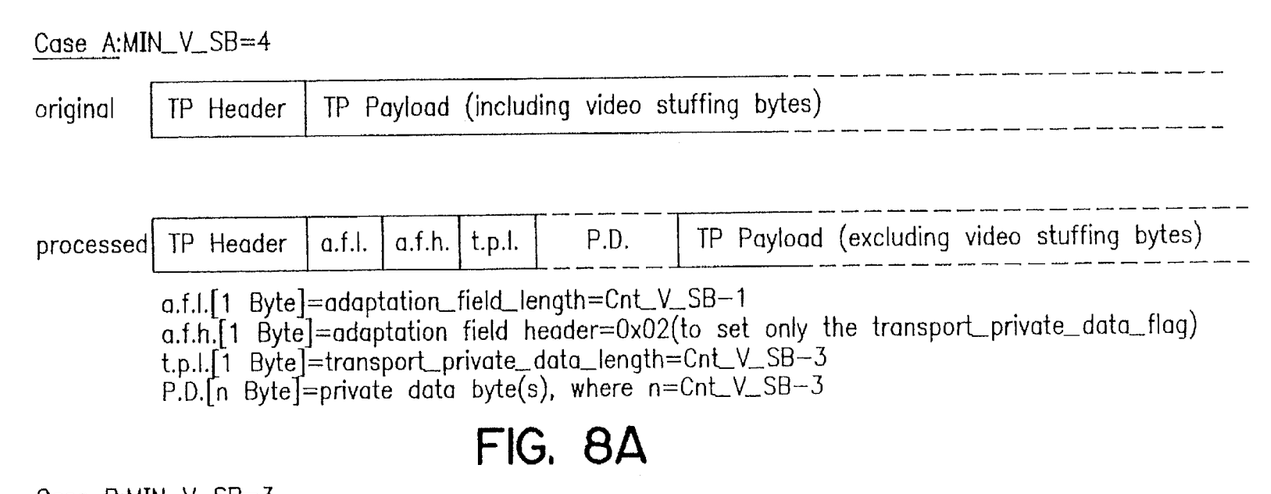
FIGS. 8A through 8C illustrate three examples of stuffing byte replacements as carried out by the techniques illustrated in FIGS. 5–7.
Figure 8B:
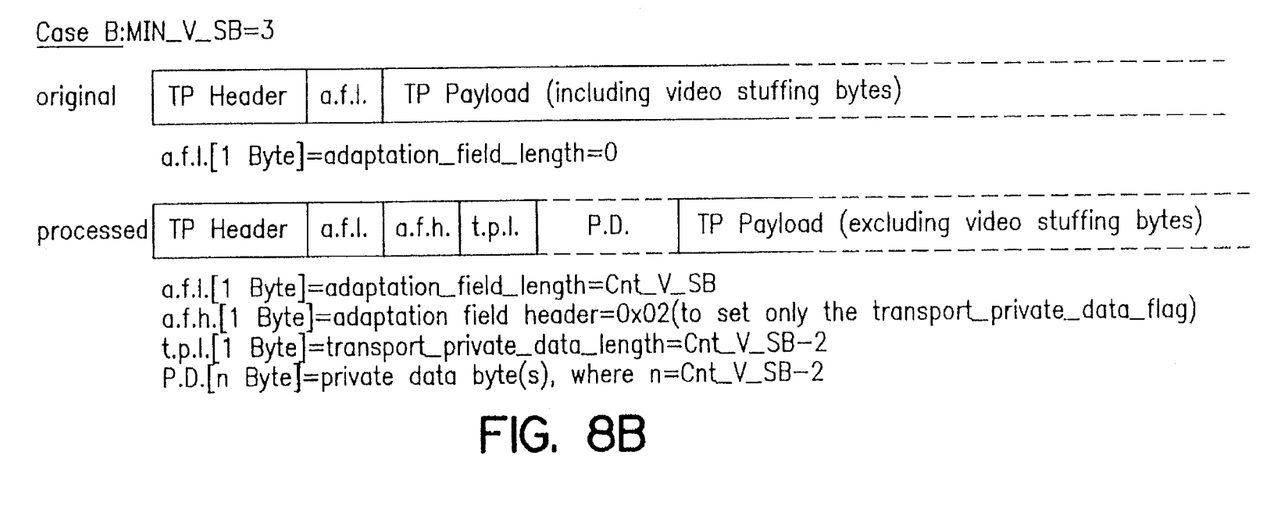
Figure 8C:
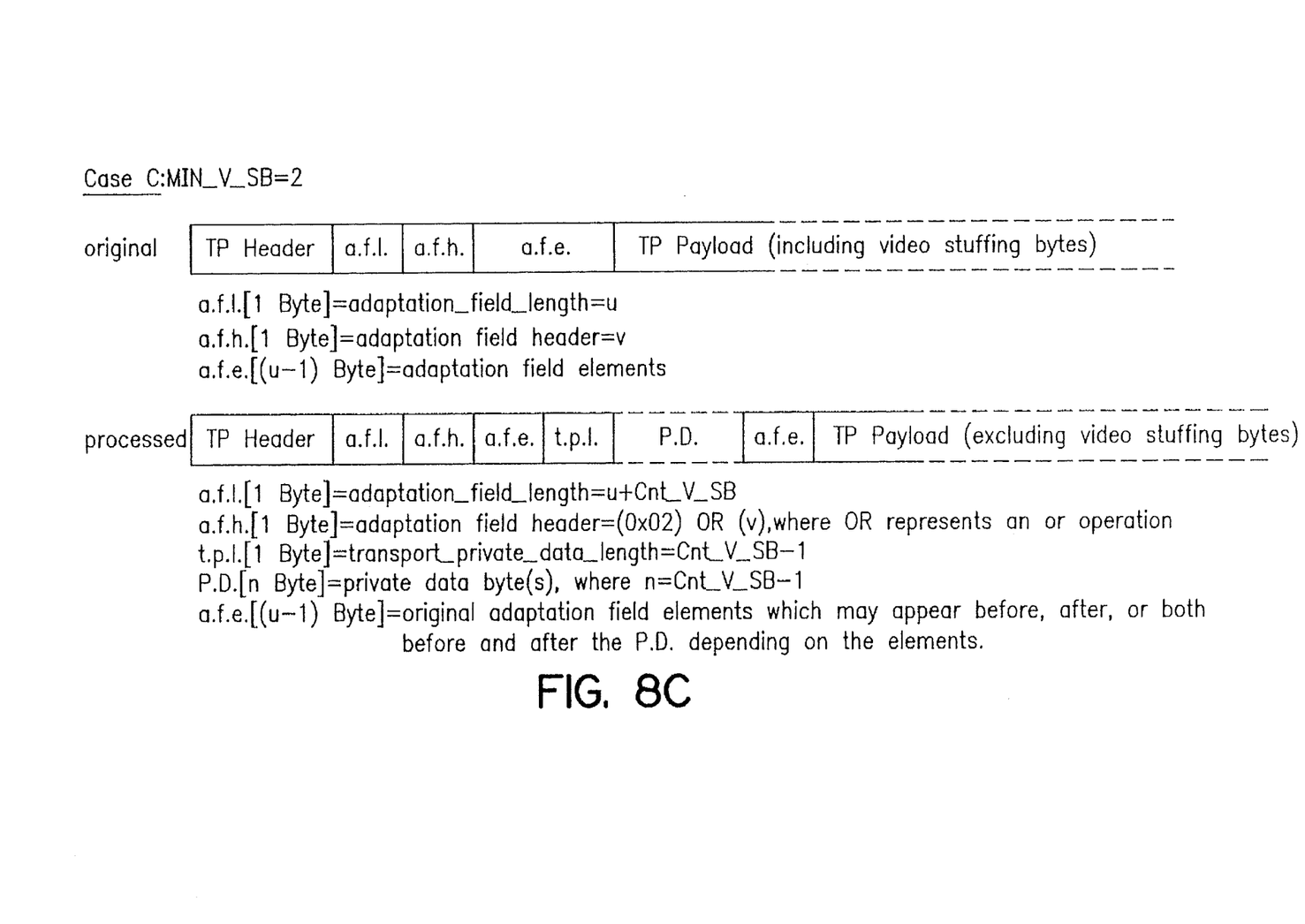

FIGS. 8A–8C show examples of Transport Packets before and after being processed by the present invention described in FIGS. 5–7. In particular, FIG. 8A shows field replacement diagrams (i.e., original and processed) for a Transport Packet which originally had no adaptation field. This corresponds to the YES path exiting from step 520 in FIG. 5. As shown in FIG. 8A, the Transport Packet Payload is stripped of its stuffing bytes, an adaptation field with the appropriate fields necessary to indicate a Transport Header carrying private data is created and the packet is reconstructed such that the Payload no longer includes stuffing bytes. As seen in the legend below the depiction of the processed Transport Packet, many of the values placed in the newly formed fields (e.g., adaptation field length) are derived from the state of variables used during the processing in FIGS. 5–7 (e.g., Cnt_V_SB).

FIG. 8B illustrates the case where the Transport Packet included an adaptation field but the length of the adaptation field was 0 bytes. This corresponds to the YES path exiting from steps 522 and 524 of FIG. 5. Again, the Transport Payload is stripped of the stuffing bytes and the appropriate adaptation fields are created and/or modified according to the value of a variable.

FIG. 8C illustrates yet another example where an adaptation field existed and the adaptation field length is not equal to zero and there is no private data. This corresponds to the NO path exiting from step 530 of FIG. 5. Again, similar stuffing byte removal and adaptation field modifications occur.

Figure 9:
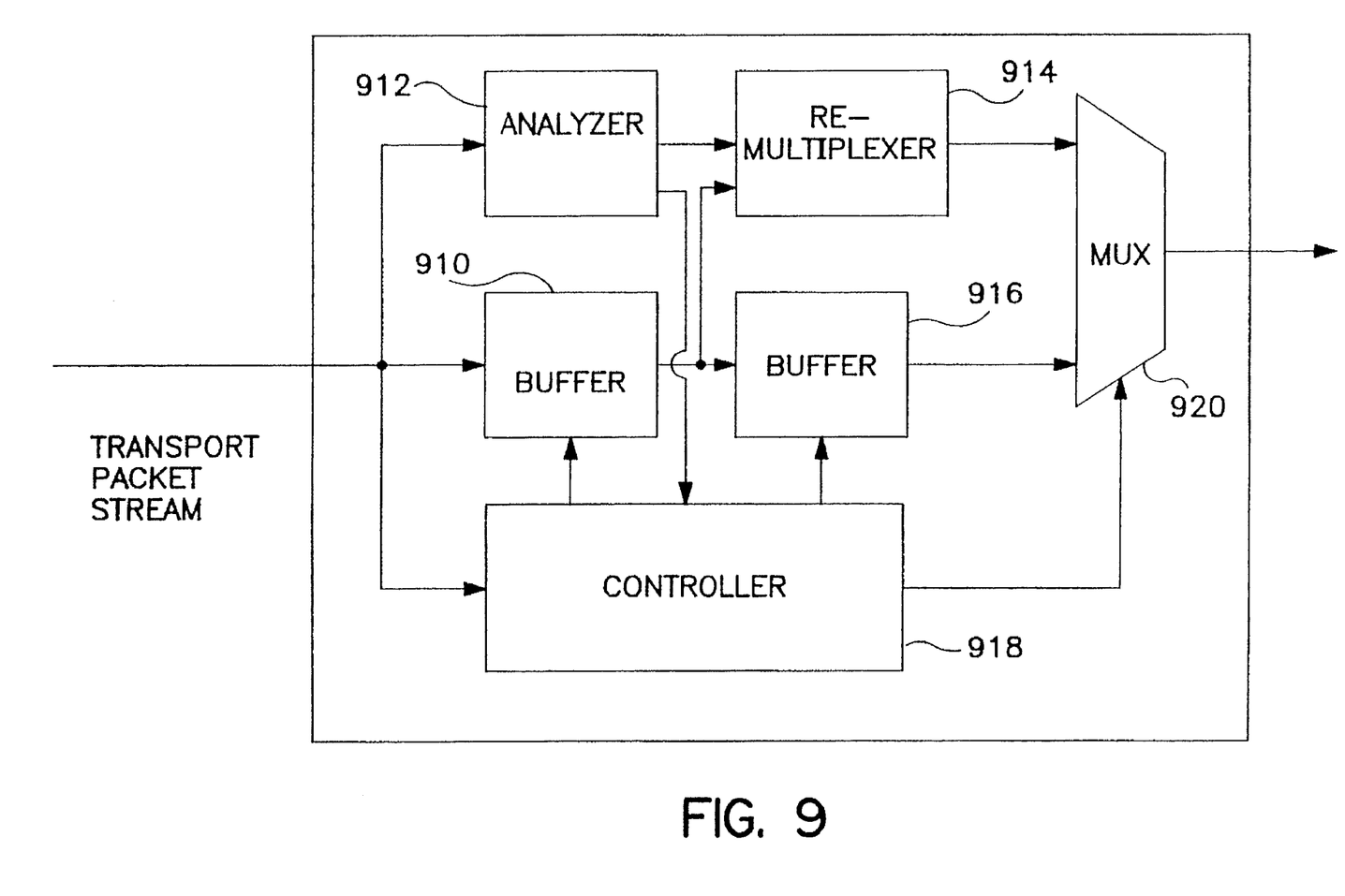
FIG. 9 shows a high-level functional block diagram of an exemplary embodiment of an encoder suitable for use with the present invention.

FIG. 9 shows a block diagram of an exemplary embodiment of a privatestuff processor suitable for use with the present invention. In FIG. 9, the Transport Stream is captured in buffer 910 as well as monitored by an analyzer 912. Analyzer 912 performs much of the processing corresponding to steps 402–404 of FIG. 4A and steps 410–418 of FIG. 4B including, for payload processing, the steps in FIGS. 5–7 except step 544. Next, analyzer 912 instructs remultiplexer 914 whether or not to perform a remultiplexing operation and with what information. Remultiplexer 914 performs the processing corresponding to steps 408, 420 and 544. Again, the Transport Stream provided by buffer 910 is temporarily delayed by buffer 916. Buffers 910 and 916 are generally used to compensate for the processing delays of analyzer 912 and remultiplexer 914, respectively. Controller 918 performs miscellaneous control operation including controlling the data flow through the buffers and ultimately deciding whether the Transport Packet will pass through multiplexer 920 or whether the processed output of remultiplexer 916 will pass.

It should be noted that, although only the general flowchart for processing the stuffing bytes in an adaptation field is provided (FIG. 4B), one of ordinary skill in the art, using the information provided and known, could easily detect and removing the stuffing bytes from the adaptation field and creating or modifying fields in the adaptation field. For instance, a field replacement diagram for this case would appear quite similar to FIG. 8C except the original Transport Packet would include stuffing bytes before the TP Payload and the processed Transport Packet would include new private data (i.e. privatestuff data in the appropriate private data location) and no stuffing bytes in the adaptation field. Moreover, the field locations described in Table I and illustrated in FIG. 3 provide the details necessary to detect and remove stuffing bytes from the adaptation field.

Although the invention is illustrated and described herein as embodied in a method and apparatus for replacing stuffing bytes with privatestuff data in an MPEG encoded data stream, the invention is not intended to be limited to the details shown. Rather, various modifications may be made in the details within the scope and range of equivalents of the claims and without departing from the spirit of the invention.

What is claimed:

1. In a system including constant bit-rate video data and variable bit-rate video data in the form of data packets which uses stuffing bytes to fill a data stream, a system for replacing the stuffing bytes with privatestuff data comprising:

means for analyzing a data packet which includes an indication of whether stuffing bytes are being used in the data packet and determining if the data packet is eligible, according to predetermined criteria, to have the stuffing bytes removed; and re-multiplexing means, responsive to the examining means, for removing the stuffing bytes from the data packet and adding predetermined privatestuff data to the data packet.

2. The system according to claim 1, wherein the data packet includes a header portion and a payload portion and the stuffing bytes are located in the header portion.

3. The system according to claim 1, wherein the data packet includes a header portion and a payload portion and the stuffing bytes are located in the payload portion.

4. The system according to claim 1, wherein the data packet includes a header portion and a payload portion, wherein the data packet further includes an indication as to whether private data is being carried by the header portion of the data packet, wherein the predetermined criteria is that no private data is being carried by the header portion of the data packet.

5. The system according to claim 1, wherein the data packet includes a header portion and a payload portion and the privatestuff data is inserted in an adaptation field in the header portion.

6. In a system including constant bit-rate video data and variable bit-rate video data in the form of data packets which uses stuffing bytes to fill a data stream, a method for removing the stuffing bytes from a data packet to create additional bandwidth and using the additional bandwidth to transmit privatestuff data comprising the steps of:

analyzing a data packet which includes an indication of whether the stuffing bytes are being used in the data packet and determining if the data packet is eligible, according to predetermined criteria, to have the stuffing bytes removed;

responsive to the analyzing step, removing the stuffing bytes from the data packet to create additional transmission bandwidth; and adding predetermined privatestuff data to the data packet thereby using the additional transmission bandwidth.

7. The method according to claim 6, wherein the data packet includes a header portion and a payload portion, and the stuffing bytes are removed from the header portion.

8. The method according to claim 6, wherein the data packet includes a header portion and a payload portion, the stuffing bytes are removed from the payload portion.

9. The method according to claim 6, wherein the data packet includes a header portion and a payload portion, wherein the data packet further includes an indication as to whether private data is being carried by the header portion of the data packet, wherein the predetermined criteria is that no private data is being carried by the header portion of the data packet.

10. The method according to claim 6, wherein the data packet includes a header portion including an adaptation field and a payload portion, the privatestuff data is added by insertion into the adaptation field.

11. In a system including constant bit-rate video data and variable bit-rate video data in the form of data packets which uses stuffing bytes to fill a data stream, a system for replacing the stuffing bytes with privatestuff data comprising:

means for analyzing a data packet which includes an indication of whether stuffing bytes are being used in the data packet; and     re-multiplexing means, responsive to the analyzing means, for removing the stuffing bytes from the data packet and adding predetermined privatestuff data to the data packet.

12. The system according to claim 11, wherein the data packet includes a header portion and a payload portion and the stuffing bytes are located in the header portion.

13. The system according to claim 11, wherein the data packet includes a header portion and a payload portion and the stuffing bytes are located in the payload portion.

14. The system according to claim 1, wherein the data packet includes a header portion and a payload portion and the privatestuff data is inserted in an adaptation field in the header portion.

15. In a system including constant bit-rate video data and variable bit-rate video data in the form of data packets which uses stuffing bytes to fill a data stream, a method for removing the stuffing bytes from a data packet to create additional bandwidth and using the additional bandwidth to transmit privatestuff data comprising:

analyzing a data packet which includes an indication of whether the stuffing bytes are being used in the data packet;

responsive to the analyzing step, removing the stuffing bytes from the data packet to create additional transmission bandwidth; and     adding predetermined privatestuff data to the data packet thereby using the additional transmission bandwidth.

16. The method according to claim 15, wherein the data packet includes a header portion and a payload portion, and the stuffing bytes are removed from the header portion.

17. The method according to claim 15, wherein the data packet includes a header portion and a payload portion, the stuffing bytes are removed from the payload portion.

18. The method according to claim 15, wherein the data packet includes a header portion including an adaptation field and a payload portion, the privatestuff data is added by insertion into the adaptation field.

\* \* \* \* \*